April 5, 1960
R. J. WERTEPNY
2,931,100
DOUBLE CUTTING SHEARS
Filed Feb. 11, 1958
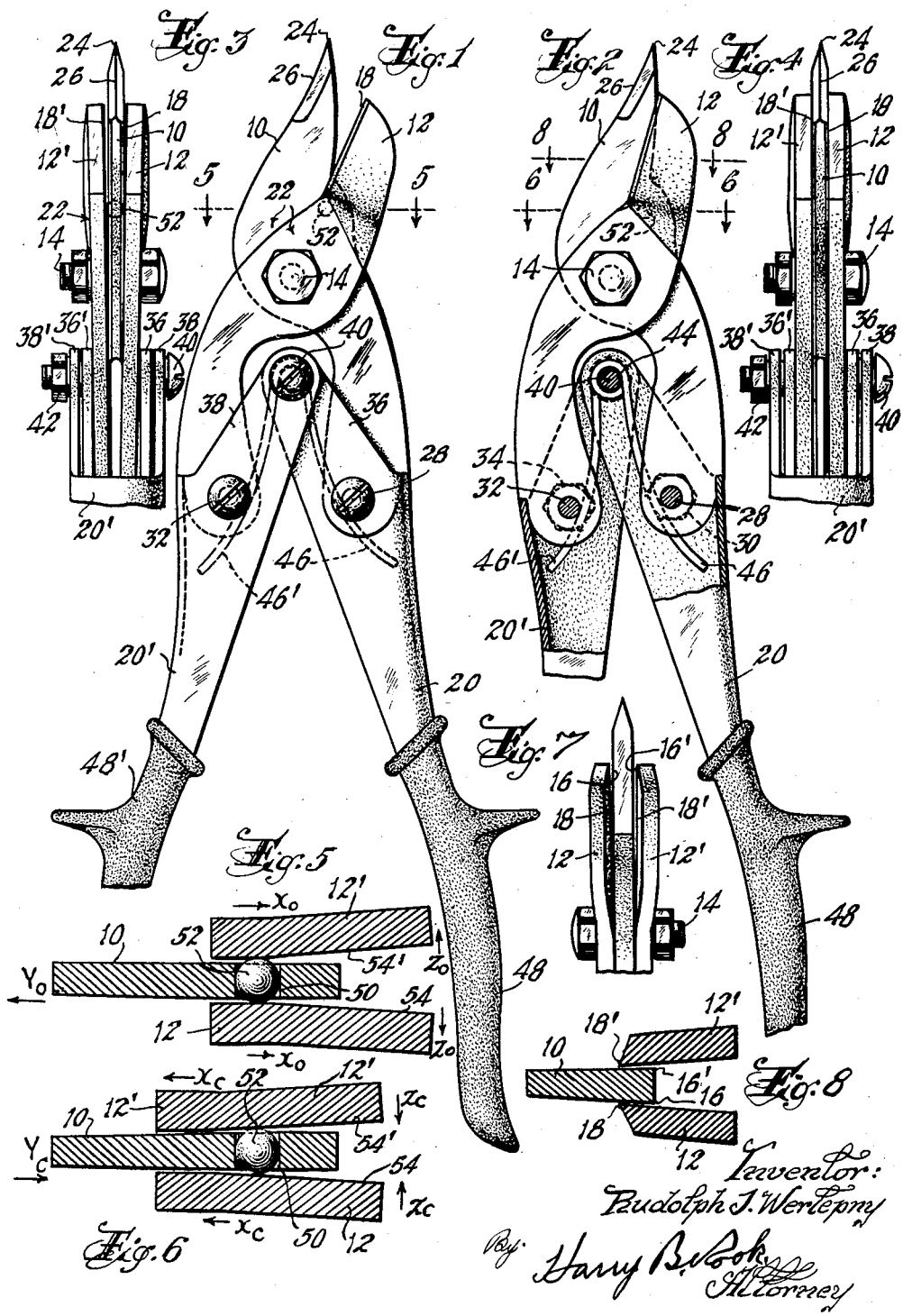
Inventor:
Rudolph J. Wertepny
By Harry B. Cook
Attorney

United States Patent Office 2,931,100
Patented Apr. 5, 1960

2,931,100

DOUBLE CUTTING SHEARS

Rudolph J. Wertepny, West Orange, N.J., assignor to J. Wiss & Sons Co., Newark, N.J., a corporation of New Jersey Application February 11, 1958, Serial No. 714,612

5 Claims. (Cl. 30—258)

The invention relates to snips or shears of the type comprising a central blade pivotally connected to a pair of outer blades, one on each side of the central blade, the central blade having a pair of laterally spaced cutting edges cooperating with a cutting edge on each of the outer blades. Shears of this type are used to cut sheet metal, and are also known as double cutting tin snips or stove pipe cutters.

In cutting sheet metal with shears of the type under consideration, a narrow strip of metal having a width corresponding substantially to the width of the space between the two outer blades is formed during the cutting operation. It is desired, of course, that the strip thus formed shall freely move out and away from the shears as the cutting operation progresses. With shears of known construction, however, the strip has a tendency to become wedged between the outer blades, thereby interrupting or impeding the progress of cutting. In cutting, the cooperating cutting edges must be closely adjacent each other as the blades slide by each other. Such close proximity of the blades, and the substantially fixed close-spacing between the blades throughout their arc of movement, as the shears are successively closed and opened, causes the interference.

A primary object of the invention is to provide double cutter shears which are constructed to minimize the tendency of the narrow strip, which is formed when cutting, to become wedged between the blades, and to thereby enable cutting with a minimum of interference and difficulty.

Another object of the invention is to provide double cutter shears which are constructed to automatically provide closely adjacent cooperating cutting edges, as the shears are closed to cut, and to automatically increase the lateral distance or spacing between the outer blades, as the shears are opened, thereby providing an area of increased size to allow the narrow cut strip to emerge from between the blades without interference.

These, and other objects and advantages of the invention will be apparent from the following detailed description, taken in conjunction with the drawing illustrating a preferred embodiment of the invention, in which:

Fig. 1 is a front elevation of double cutting shears having the blades thereof in open position preparatory to cutting;

Fig. 2 is a view similar to Fig. 1, but partly broken away and in section, the blades being shown in closed position after cutting;

Fig. 3 is a partial side view looking toward the left side of the shears as shown in Fig. 1;

Fig. 4 is a partial side view looking toward the left side of the shears as shown in Fig. 2;

Fig. 5 is a horizontal cross-section taken approximately in the plane of line 5—5 of Fig. 1;

Fig. 6 is a horizontal cross-section taken approximately in the plane of line 6—6 of Fig. 2;

Fig. 7 is a partial side view looking toward the right side of the shears as shown in Fig. 2; and Fig. 8 is a horizontal cross section taken approximately in the plane of line 8—8 of Fig. 2.

Generally, shears made in accordance with the invention comprise a central blade 10 and a pair of outer blades 12, 12', one on each side of the central blade. The blades are pivotally connected to each other at 14 in any suitable manner. The central blade is provided with laterally spaced cutting edges 16, 16' for cooperation with cutting edges 18, 18', respectively, formed on blades 12, 12'. The central blade is secured to a handle 20, and the outer blades are secured to a handle 20'. The central and outer blades are shaped or dimensioned to provide overlapping areas, generally designated 22, between the pivot 14 and the lowermost ends of the blades' cutting edges, when the blades are in their extreme open position, as shown in Fig. 1, and, of course, when the shears are fully closed, as shown in Fig. 2.

In order to minimize the tendency of the narrow strip, which is being cut out of the sheet metal, to become wedged between the outer blades, the blades are provided with cooperating camming means to automatically increase the lateral spacing between the outer blades, as the blades are moved from their closed position toward their open position. By thus increasing the distance between the outer blades in a direction parallel to the width of the cut strip, the strip will freely move out from between the blades. Upon cutting, or as the blades are returned from the normal open position shown in Fig. 1 to the closed cutting position shown in Fig. 2, the outer blades are moved toward each other so that the cutting edges 16, 18 and 16', 18' are brought into the immediate coacting adjacency necessary to suitably perform the cutting operation. The lateral spreading of the outer blades as the shears are opened, and their return movement toward the central blade as the shears are closed, is accomplished through the medium of the blades' cooperating camming means, by the force supplied by the usual spring means normally urging the shears to open position, the ordinary manual force applied to the handles to close the shears, and the inherent resiliency of the outer blades tending to spring the outer blades toward the inner blade.

In greater detail, and as illustrated in the drawing, the central blade is formed with a sharp point 24 and a cutting edge 26 extending downwardly from the point at the rear of the blade to enable penetrating a closed tube of sheet metal, such as a stove pipe, in order to furnish an opening for the initiation of cutting with the blades. The central blade is received within the handle 20, which is substantially U-shaped in cross-section. The lower end of the blade is provided with an aperture, as are the side walls of the handle. A threaded bolt 28 is passed through the handle and blade apertures, and the connection is made secure with a nut 30. The outer blades 12 and 12' are similarly received within and secured to the handle 20' by a threaded bolt 32 and a nut 34. In the shears illustrated, a compound leverage is provided, and for this purpose the handle 20 is provided with upstanding portions 36, 36' which are connected to similar and overlapping portions 38, 38' provided by the handle 20'. As shown in Figs. 3 and 4, these handle portions are pivotally connected by a bolt and nut arrangement 40 and 42. To normally maintain the shears in open position as shown in Fig. 1, a coiled spring 44 is disposed around the shank of the bolt 40, with one end 46 of the spring bearing against the handle 20, or the bolt 28, and the other end 46' bearing against the handle 20', or the bolt 32. The handles may be covered with suitably molded hand gripping sleeves 48, 48'.

To increase the lateral spacing between the outer blades as the shears are opened, the central blade is provided with laterally projecting means in engagement with camming surfaces provided by the outer blades. Preferably, and as shown in Figs. 5 and 6, the central blade 10 is provided with an opening 50 extending laterally therethrough. The opening is located in the area 22 where the blades overlap, just rearwardly of the front edge of the blade, and below the lowermost ends of the cutting edges 16, 16'. A ball bearing 52, having a diameter slightly smaller than the diameter of the aperture and slightly greater than the thickness of the central blade, is disposed in the aperture for engagement with the inner surfaces, designated 54, 54', of the outer blades 12, 12', respectively. In the area of engagement of the ball bearing with the outer blades, throughout the arc of movement of the central and outer blades, the inner surfaces 54, 54' of the outer blades are inclined so that they diverge in the direction of opening movement of the outer blades, or conversely, the camming surfaces are convergingly inclined in the direction of closing movement of the outer blades.

The camming action provided by the cooperation of the ball bearing with the described inclined camming surfaces on the outer blades to spread the outer blades apart as the shears are opened and to move them together as the shears are closed may be best understood from a viewing of Figs. 5 and 6. Upon opening movement, or when the outer blades are moved in the direction of the arrows $X_0$ and the central blade is moved in the direction of the arrow $Y_0$ to reach the fully open position of the shears, as shown in Figs. 1 and 5, the outer blades are forced apart, as indicated by the arrows $Z_0$. Whe nthe shears are closed, as shown in Fig. 2, the outer blades, as shown in Fig. 6, have moved in the direction of the arrows $X_c$ and the central blade has moved in the direction of the arrow $Y_c$, resulting in the outer blades having been moved toward each other, as indicated by the arrows $Z_c$. By moving the outer blades toward each other, and toward the central blade, the blades are brought into the desired close proximity to allow the cutting edges to cooperate in providing clean, sharply defined cuts. Figs. 7 and 8 show the relationship of the cutting edges 16, 18 and 16', 18' as the blades have completed the cutting portion of the cycle.

To further assist the narrow cut strip to emerge from between the outer blades without interference, and as shown in Fig. 7, the outer blades may be deformed or bent out of their planes in the areas which extend rearwardly of their respective cutting edges 18, 18'. The divergence of the outer blades in a direction rearwardly of their cutting edges additionally increases the spacing between the outer blades in the direction or path which the strip will follow as cutting proceeds.

The particular embodiment oft he invention illustrated and described in detail is preferred, because of the smooth camming action afforded and the ease of manufacturing the shears. It will be understood, however, that various modifications may be made without departing from the spirit and scope of the invention. For example, the central blade may be formed with fixed protuberances on each side thereof in lieu of the described ball bearing arrangement. The sliding friction afforded by such construction, however, is not as smooth in action as obtained with the ball bearing. Also, it is within the scope of the invention to obtain the described camming action with the advantages of ball bearing contact by shaping the central blade to provide inclined camming surfaces on each side thereof, and mounting ball bearings in depressions formed in each of the outer blades. Such construction, of course, involves additional manufacturing operations, and therefore is not as desirable as the more simplified described preferred embodiment.

These, and other modifications, are contemplated within the spirit and scope of the invention, as sought to be defined in the following claims.

I claim:
1. Double cutting shears comprising a central blade having laterally spaced cutting edges and a pair of outer blades each having a cutting edge for cooperation with said central blade cutting edges, said blades being pivotally connected and having areas thereof in overlapping relationship when the shears are in fully open position, and cooperating camming means provided by the central blade and the outer blades in said overlapping areas and responsive to the relative movement of the central blade and the outer blades to automatically increase the lateral spacing between the outer blades upon opening of the shears.

2. Double cutting shears comprising a central blade having laterally spaced cutting edges and a pair of outer blades each having a cutting edge for cooperation with said central blade cutting edges, said blades being pivotally connected and having areas thereof in overlapping relationship when the shears are in fully open position, and means projecting laterally from the central blade in engagement with inclined camming surfaces provided by the outer blades in said overlapping areas and responsive to the relative movement of the central blade and the outer blades to automatically increase the lateral spacing between the outer blades upon opening of the shears.

3. Double cutting shears comprising a central blade having laterally spaced cutting edges and a pair of outer blades each having a cutting edge for cooperation with said central blade cutting edges, said blades being pivotally connected and having areas thereof in overlapping relationship when the shears are in fully open position, and means projecting laterally from the central blade in engagement with the inner surfaces of the outer blades in said overlapping areas, said inner surfaces being divergingly inclined in the direction of opening movement of the outer blades, whereby the lateral spacing between the outer blades is increased upon opening of the shears.

4. Double cutting shears comprising a central blade having laterally spaced cutting edges and a pair of outer blades each having a cutting edge for cooperation with said central blade cutting edges, said blades being pivotally connected and having areas thereof in overlapping relationship when the shears are in fully open position, an aperture extending laterally through said central blade, a ball bearing having a diameter slightly smaller than said aperture and slightly greater than the thickness of the central blade disposed in said aperture, and camming surfaces for cooperation with said ball bearing provided on the inner surfaces of said outer blades, said camming surfaces being divergingly inclined in the direction of opening movement of the outer blades, said ball bearing and camming surfaces being located in said overlapping areas.

5. Double cutting shears as set forth in claim 4, wherein the outer blades are divergingly inclined in a direction rearwardly of their cutting edges.

References Cited in the file of this patent
UNITED STATES PATENTS 2,529,171    Menser _____ Nov. 7, 1950